(12) United States Patent
Eskew et al.

(10) Patent No.: US 12,276,433 B2
(45) Date of Patent: Apr. 15, 2025

(54) SELF-ORIENTING REFRIGERANT SENSOR SYSTEMS

(71) Applicant: Johnson Controls Tyco IP Holdings LLP, Milwaukee, WI (US)

(72) Inventors: Robert L. Eskew, Kingman, KS (US); Brian D. Rigg, Douglass, KS (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 286 days.

(21) Appl. No.: 17/894,897

(22) Filed: Aug. 24, 2022

(65) Prior Publication Data

US 2023/0062041 A1    Mar. 2, 2023

Related U.S. Application Data (63) Continuation of application No. 16/836,475, filed on Mar. 31, 2020, now Pat. No. 11,428,435.

(51) Int. Cl.
| | |
|---|---|
| *F24F 11/89* | (2018.01) |
| *F24F 1/0063* | (2019.01) |
| *F24F 11/36* | (2018.01) |
| *G01M 1/12* | (2006.01) |
| *G01M 3/02* | (2006.01) |

(52) U.S. Cl.
CPC ............ *F24F 11/89* (2018.01); *F24F 1/0063* (2019.02); *F24F 11/36* (2018.01); *G01M 1/122* (2013.01); *G01M 3/02* (2013.01)

(58) Field of Classification Search
CPC .................................. F24F 11/89; F24F 11/36
See application file for complete search history.

(56) References Cited

U.S. PATENT DOCUMENTS

| | | |
|---|---|---|
| 4,893,290 A | 1/1990 | McNeel et al. |
| 7,926,614 B2 | 4/2011 | Tenghamn et al. |

(Continued)

FOREIGN PATENT DOCUMENTS

| | | | | |
|---|---|---|---|---|
| WO | WO-2019162993 A1 | * | 8/2019 | ............ F24F 1/0018 |
| WO | WO-2019218058 A1 | * | 11/2019 | ............... E04H 7/22 |

OTHER PUBLICATIONS

DOL 104 4-20 mA—Technical User Guide, DOL Sensors, Nov. 2, 2017, 4 pgs.

(Continued)

*Primary Examiner* — Schyler S Sanks
(74) *Attorney, Agent, or Firm* — Fletcher Yoder, P.C.

(57) ABSTRACT

A self-orienting sensing system for a heating, ventilation, and air conditioning (HVAC) system includes a housing having a main body. The housing defines a sensing aperture in a first portion of the main body and a mounting channel in a second portion of the main body. The self-orienting sensing system includes a sensing element retained within the housing. The sensing element is configured to detect leaked refrigerant that enters the housing via the sensing aperture. The self-orienting sensing system also includes a mounting retainer configured to extend through the mounting channel and couple the housing to an interior surface of an air handling enclosure of the HVAC system. The mounting retainer enables the mounting channel to rotate about the mounting retainer to automatically align the sensing aperture in a target sensing orientation based on a weight of the housing under the force of gravity.

20 Claims, 10 Drawing Sheets

(56) References Cited

U.S. PATENT DOCUMENTS

| | | | |
|---|---|---|---|
| 10,107,480 B1 | 10/2018 | Ladewig et al. | |
| 2011/0083504 A1* | 4/2011 | Unger | G01F 22/00 |
| | | | 73/304 C |
| 2021/0041114 A1* | 2/2021 | Watanabe | F24F 1/0063 |
| 2021/0223089 A1* | 7/2021 | Montplaisir | G01S 17/08 |

OTHER PUBLICATIONS

Hydrogen Sulfide Sensor User Manual, Unisense A/S, May 2020, 28 pgs.
Temperature and Water Level Sensors for Tank Gauging Systems, Emerson-Rosemount 565/566/765/614, May 2019, 36 pgs.

* cited by examiner

SELF-ORIENTING REFRIGERANT SENSOR SYSTEMS

CROSS REFERENCE TO RELATED APPLICATIONS

This is a continuation application of U.S. patent application Ser. No. 16/836,475, entitled "SELF-ORIENTING REFRIGERANT SENSOR SYSTEMS," filed Mar. 31, 2020, which is hereby incorporated by reference in its entirety for all purposes.

BACKGROUND

The present disclosure relates generally to heating, ventilating, and air conditioning (HVAC) systems, and more particularly to self-orienting refrigerant sensor systems for HVAC systems.

Residential, light commercial, commercial, and industrial HVAC systems are used to control temperatures and air quality in residences and buildings. Generally, the HVAC systems may circulate a refrigerant through a closed refrigeration circuit between an evaporator, where the refrigerant absorbs heat, and a condenser, where the refrigerant releases heat. The refrigerant flowing within the refrigerant circuit is generally formulated to undergo phase changes within the normal operating temperatures and pressures of the system so that quantities of heat can be exchanged by virtue of the latent heat of vaporization of the refrigerant. As such, the refrigerant flowing within a HVAC system travels through multiple conduits and components of the refrigerant circuit.

Certain components of HVAC systems, such as air handlers or heat exchangers therein, may be installed in a particular position that suits the desired operation of the HVAC systems. For example, an air handler may be designed for any one of upflow, downflow, horizontal right, or horizontal left configurations, which describes a path that air may flow relative to a heat exchanger of the air handler. These air handlers may be manufactured and shipped from a factory with a majority of components already installed for one of these configurations. As such, should a service technician or installer determine that that the air handler is to be installed in a different configuration, the service technician may be recruited to manually adjust components within the air handler for the new configuration.

SUMMARY

In one embodiment of the present disclosure, a self-orienting sensing system for a heating, ventilation, and air conditioning (HVAC) system includes a housing having a main body. The housing defines a sensing aperture in a first portion of the main body and a mounting channel in a second portion of the main body. The self-orienting sensing system includes a sensing element retained within the housing. The sensing element is configured to detect leaked refrigerant that enters the housing via the sensing aperture. The self-orienting sensing system also includes a mounting retainer configured to extend through the mounting channel and couple the housing to an interior surface of an air handling enclosure of the HVAC system. The mounting retainer enables the mounting channel to rotate about the mounting retainer to automatically align the sensing aperture in a target sensing orientation based on a weight of the housing under the force of gravity.

In another embodiment of the present disclosure, a heat exchanger for a heating, ventilation, and air conditioning (HVAC) system includes a first coil portion and a second coil portion disposed within an air handling enclosure. The HVAC system also includes a self-orienting sensing system having a housing that defines a main body. The housing defines a mounting channel in an upper portion of the main body, a sensing aperture in a lower portion of the main body, and a sensing chamber between the mounting channel and the sensing aperture. The sensing chamber is fluidly coupled to the sensing aperture and configured to retain a refrigerant sensing element therein. The self-orienting sensing system also includes a mounting retainer extended through the mounting channel and coupling the housing to a surface of the heat exchanger. The mounting retainer enables the mounting channel to pivot relative to the mounting retainer to passively align the housing to a target sensing orientation under the force of gravity.

In a further embodiment of the present disclosure, a heating, ventilation, and air conditioning (HVAC) system includes an air handling enclosure configured to be positioned in a vertical configuration or a horizontal orientation and a self-orienting sensing system disposed within the air handling enclosure. The self-orienting sensing system includes a housing having a main body that defines a mounting channel and a sensing chamber, which is fluidly coupled to an interior of the air handling enclosure via a sensing aperture. The self-orienting sensing system also includes a refrigerant sensing element retained within the sensing chamber. The refrigerant sensing element and the housing contribute to a center of gravity of the self-orienting sensing system that is between the mounting channel and a lower edge of the housing. Additionally, the self-orienting sensing system includes a mounting retainer extended through the mounting channel and coupled to an interior surface of the air handling enclosure. The mounting retainer enables the mounting channel to rotate relative to the mounting retainer to passively align the sensing aperture in a target sensing orientation based on the center of gravity.

Other features and advantages of the present application will be apparent from the following, more detailed description of the embodiments, taken in conjunction with the accompanying drawings which illustrate, by way of example, the principles of the application.

DETAILED DESCRIPTION

As increasing attention is directed to including leaked refrigerant sensors within air handlers, additional complexity may be introduced within the installation processes for the HVAC systems introduced above. For example, because some leaked refrigerant sensors may operate more effectively in a particular orientation relative to gravity, a service technician may manually adjust and visually verify the proper installation of the refrigerant sensor, relative to a desired or target configuration of the air handler. Accordingly, it would be desirable to reduce the installation complexity for these HVAC systems that may be installed in one of multiple possible configurations, such as by reducing effort utilized to install refrigerant sensors in a desired orientation. As used herein and discussed below, an air handler generally refers to a forced-air system that may include or exclude a furnace to facilitate conditioning of an interior space.

The present disclosure is directed to refrigerant leak detection systems for HVAC systems, and more particularly, to self-orienting sensing systems. As mentioned above, certain refrigerant sensors may be orientation-specific, in that the refrigerant sensors may operate more effectively when a sensing end thereof is pointed downward to sense refrigerant correctly and/or maintain a moisture and/or debris-free environment. However, as certain air handlers, heat exchangers, or other components of HVAC systems may be installed of one multiple configurations (e.g., upflow, downflow, horizontal right, horizontal left), the orientation-specificity of the refrigerant sensor may increase a complexity of the installation process for these components. That is, absent the present disclosure, a service technician may be instructed to manually adjust the physical position of the refrigerant sensor to reach the appropriate orientation.

Accordingly, it is presently recognized that a self-orienting sensing system would greatly reduce the installation complexity traditionally accorded by certain orientation-specific refrigerant sensors. As a non-limiting example, the self-orienting sensing system may include a mounting retainer (e.g., shoulder screw, long-threaded screw, bolt) that couples to a delta plate (e.g., air bypass sealing plate) of a heat exchanger. However, it should be understood that the self-orienting sensing system may be installed within any suitable location for which leaked refrigerant detection may be beneficial. The mounting retainer may include a relatively long and exposed shank (e.g., smooth surface, threaded surface) that extends between a head portion of the mounting retainer and the delta plate, thereby forming a pivot axis about which a mounting channel of a sensor housing may rotate. The sensor housing may be counter weighted, in one or multiple manners discussed below, to establish a center of gravity of the sensor housing that is between the mounting channel and a bottom or lower edge of the sensor housing. In some embodiments, the sensor housing includes a sensing aperture formed within a bottom surface of the sensor housing. As such, a sensing element retained within the sensor housing may be naturally and passively self-oriented to a downward-facing target sensing position that enables effective refrigerant leak detection, without manual intervention from a service technician. As discussed below, the self-orienting sensing system may also enhance the ability and service life of the sensing element to detect refrigerant leaks. Indeed, the sensor housing may guard the sensing element from unintentional contact from condensate, which may drip from heat exchanger coils adjacent to the delta plate to which the self-orienting sensing system is coupled. Certain embodiments of the sensor housing may also include flow-inducing and/or flow-guiding apertures that encourage additional air samples to flow past the sensing element for improved detection of refrigerant leaks. Moreover, in some embodiments, the self-orienting sensing system may be installed during manufacturing of the HVAC system and automatically align to the target sensing position for any of the various configurations in which the HVAC system is installed.

Figure 1:
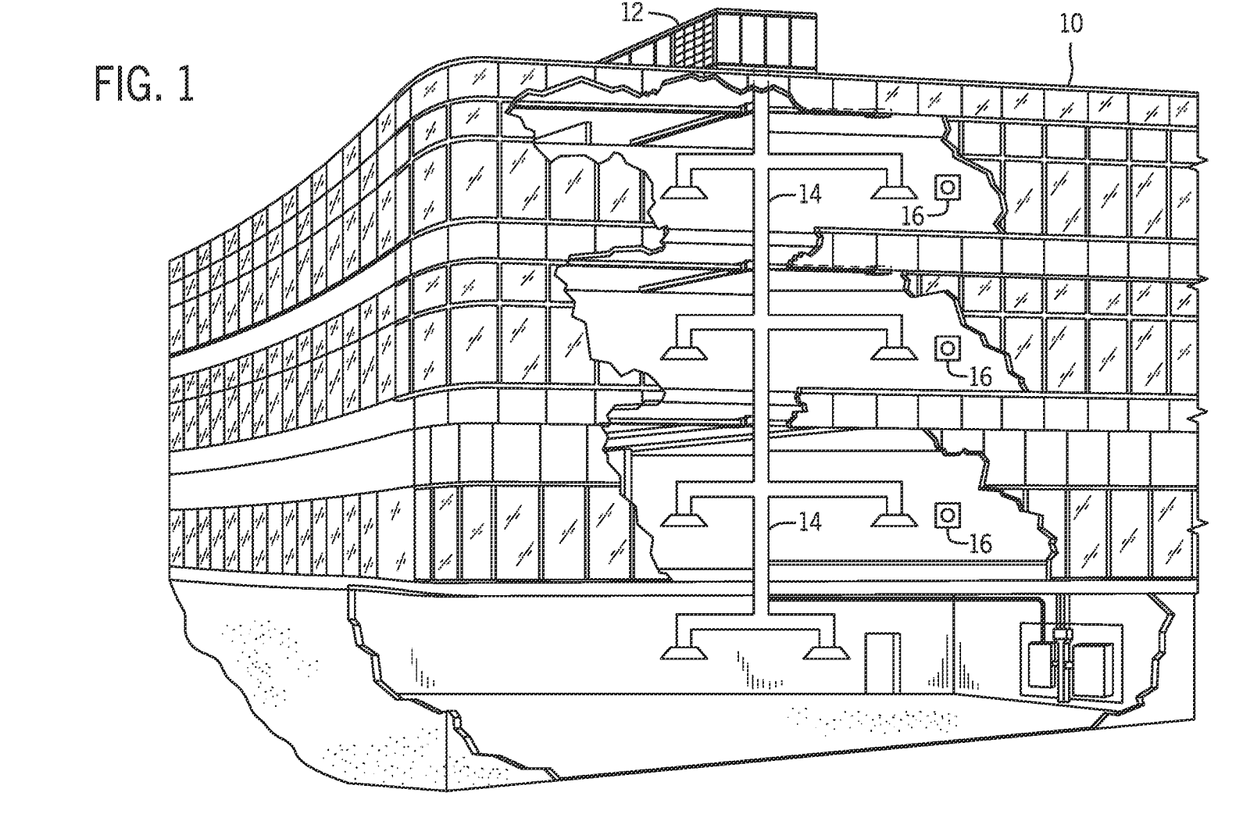
FIG. 1 is an illustration of an embodiment of a building having a HVAC system, in accordance with present techniques.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes a HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the systems shown in FIG. 2, which includes an outdoor HVAC unit 58 and an indoor HVAC unit 56. Indeed, as discussed below, the presently disclosed self-orienting sensing system may provide particular benefits for air handlers that may be installed in one of multiple configurations.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
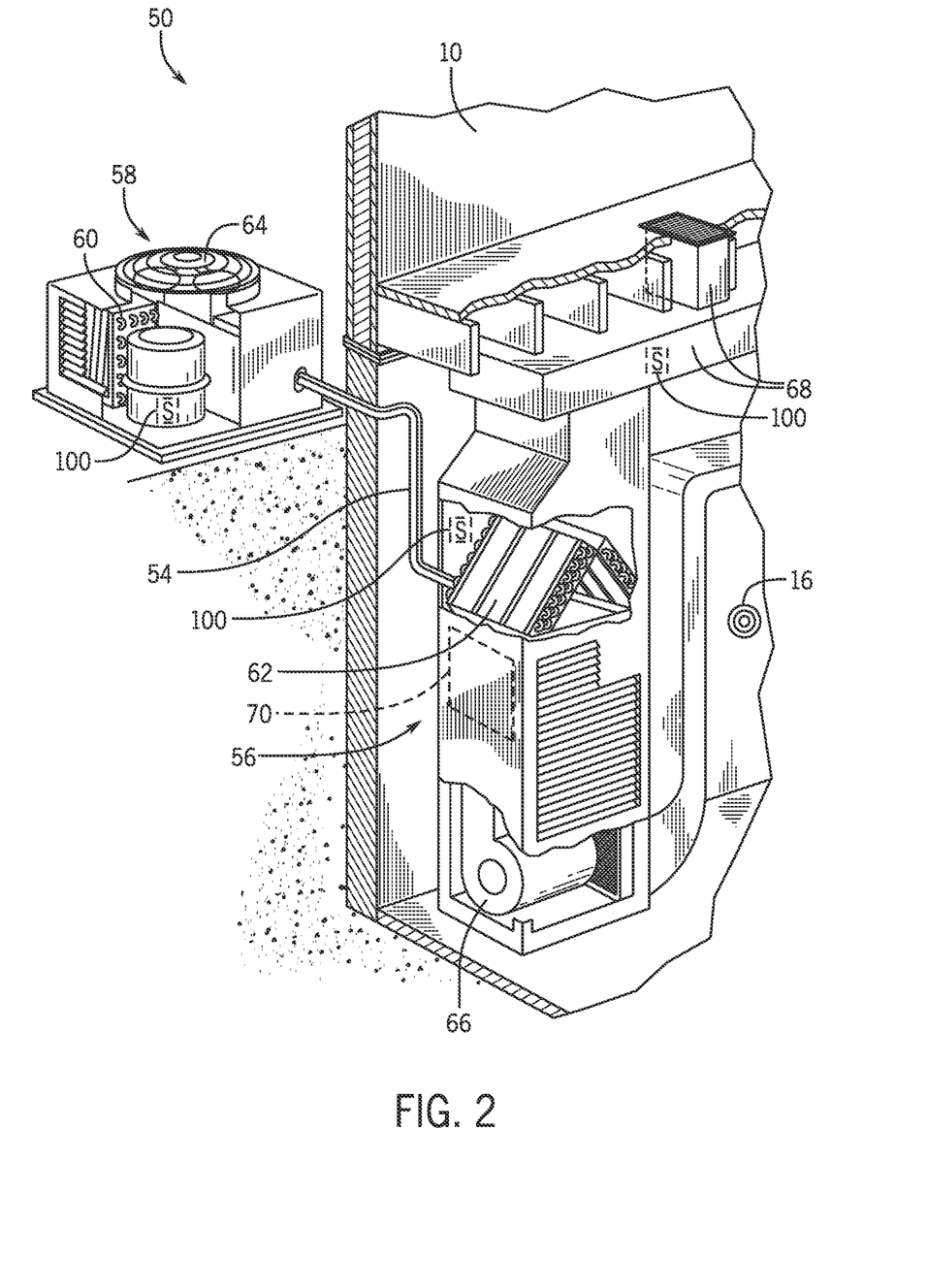
FIG. 2 is an illustration of an embodiment of a split system of the HVAC system, which may be utilized with a residence or the building of FIG. 1, in accordance with present techniques.

FIG. 2 illustrates an embodiment of a residential heating and cooling system 50, in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and unit 12 of FIG. 1 may be implemented as a split HVAC system. In general, the building 10 (e.g., residence, commercial building) conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of building 10 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 2 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the building 10. The overall system operates to maintain a desired temperature as set by a system controller, such as the control device 16 discussed above. When the temperature sensed inside the building 10 is higher than the set point on the control device 16, or the set point plus a small amount, the residential heating and cooling system 50 may become operative to refrigerate additional air for circulation through the building 10. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger that is separate from heat exchanger 62, such that air directed by the blower 66 passes over the tubes or pipes and extracts heat from the combustion products. The heated air may then be routed from the furnace system 70 to the ductwork 68 for heating the building 10.

The overall system operates to maintain a desired temperature as set by the control device 16 (e.g., thermostat), in certain embodiments. For example, in a cooling mode of operation, when the temperature sensed inside the building 10 is higher than the set point on the control device 16 (plus a small amount), the air conditioner may operate to refrigerate additional air for circulation through the building 10. When the temperature reaches the set point (minus a small amount), the unit may stop the refrigeration cycle temporarily.

Figure 3:
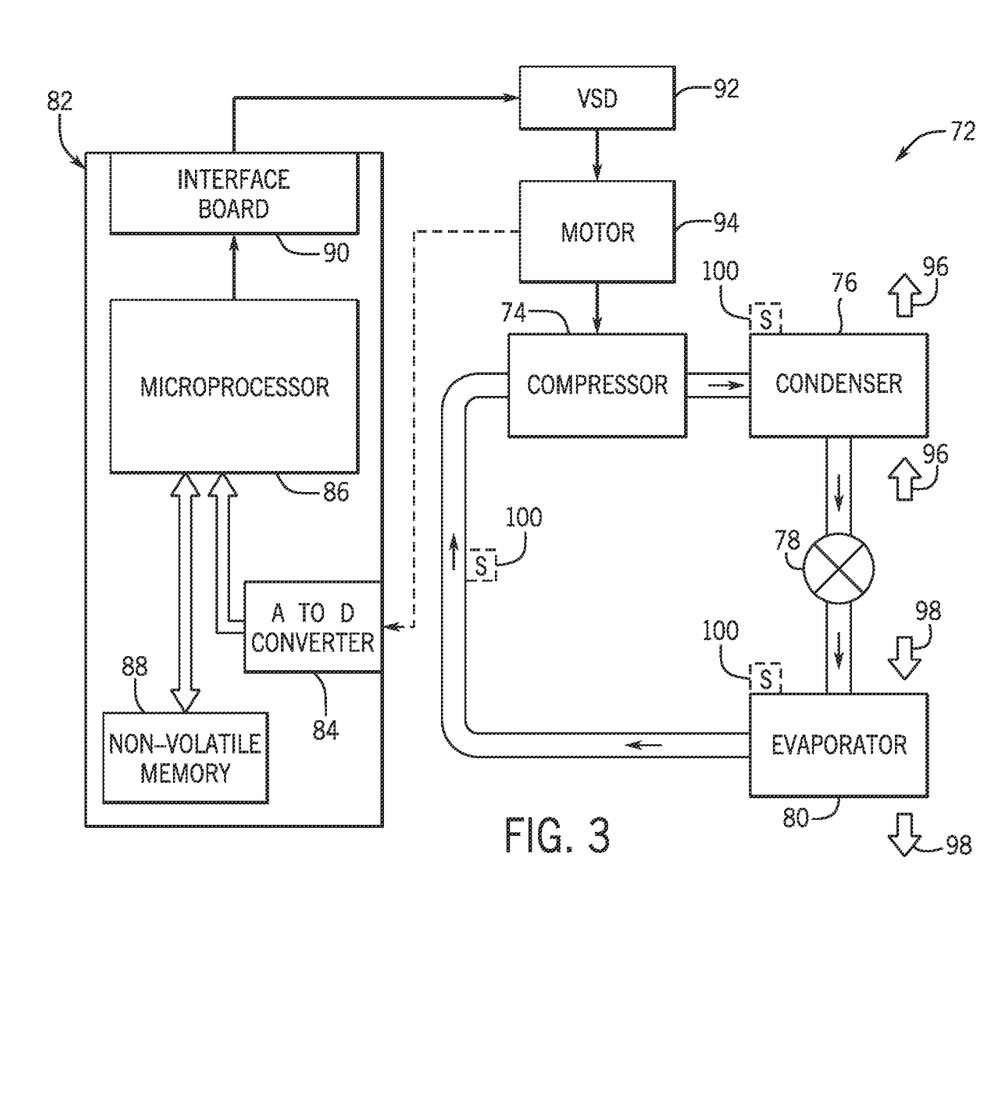
FIG. 3 is a schematic diagram of an embodiment of a refrigeration system of the HVAC system shown in FIG. 1, in accordance with present techniques.

FIG. 3 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the building 10. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As mentioned, above the HVAC systems discussed herein may benefit from having a self-orienting sensing system that enables effective monitoring for refrigerant leaks from the vapor compression system 72, regardless of the configuration in which the HVAC systems or components thereof are installed. Generally, self-orienting sensing system may be disposed within a packaging or housing of any suitable interior units or exterior units of the HVAC systems. As examples, one or multiple self-orienting sensing systems may be disposed in one or more suitable locations throughout the HVAC unit 12, the residential heating and cooling system 50, the vapor compression system 72, or other HVAC systems. The self-orienting sensing systems are capable of detecting leaked refrigerant from any HVAC system component, and thus are advantageously located near or proximate to components of the vapor compression system 72 having refrigerant therein. For example, as illustrated in FIG. 2, self-orienting sensing systems may be placed in sensor locations 100 near the heat exchanger 60, near the heat exchanger 62 (e.g., within the air handling enclosure), and/or within the ductwork 68 of the residential heating and cooling system 50. Moreover, as illustrated in FIG. 3, self-orienting sensing systems may be optionally placed in sensor locations 100 along conduits, near the condenser 76, and/or near the evaporator 80 of the vapor compression system 72. In general, placing the self-orienting sensing systems near, within inches, within feet, or proximate to components having refrigerant flowing therein increases a probability that a detectable amount of leaked refrigerant will reach the self-orienting sensing systems. Moreover, the self-orienting sensing systems may be desirably placed within bent portions of the ductwork 68, corners of rooms of the building 10, or other locations that generally hinder airflow, such that leaked refrigerant near the refrigerant sensors is less likely to be dissipated or displaced by the airflow before detection. The self-orienting sensing systems may also be placed in any other suitable locations, such as within a utility room, attic space, or portion of the building 10, to monitor for refrigerant leaks in accordance with the embodiments discussed herein. In other embodiments contemplated herein, the self-orienting features of the self-orienting sensing systems may also be extended to other sensors that operate more effectively in a particular orientation.

In general, detection of refrigerant outside of the vapor compression system 72 is indicative of a refrigerant leak. Moreover, the refrigerant employed in the vapor compression system 72 may be any desired refrigerant, such as an A2L refrigerant, a low global warming potential (GWP) refrigerant, R-32, R-1234ze, R-1234yf, R-454A, R-454C, R-455A, R-447A, R-452B, R-454B, and so forth that is used by the HVAC system for conditioning an interior space of the building 10. As used herein, "refrigerant" refers to any operating fluid normally contained within the vapor compression system 72 and employed to facilitate cooling, including any suitable refrigerant or refrigerant mixture having additives such as oils, indicators, stabilizers, dyes, fragrances, or any combination thereof. The term "refrigerant" may broadly reference commercial refrigerants and may exclude contaminants, such as water.

Figure 4:
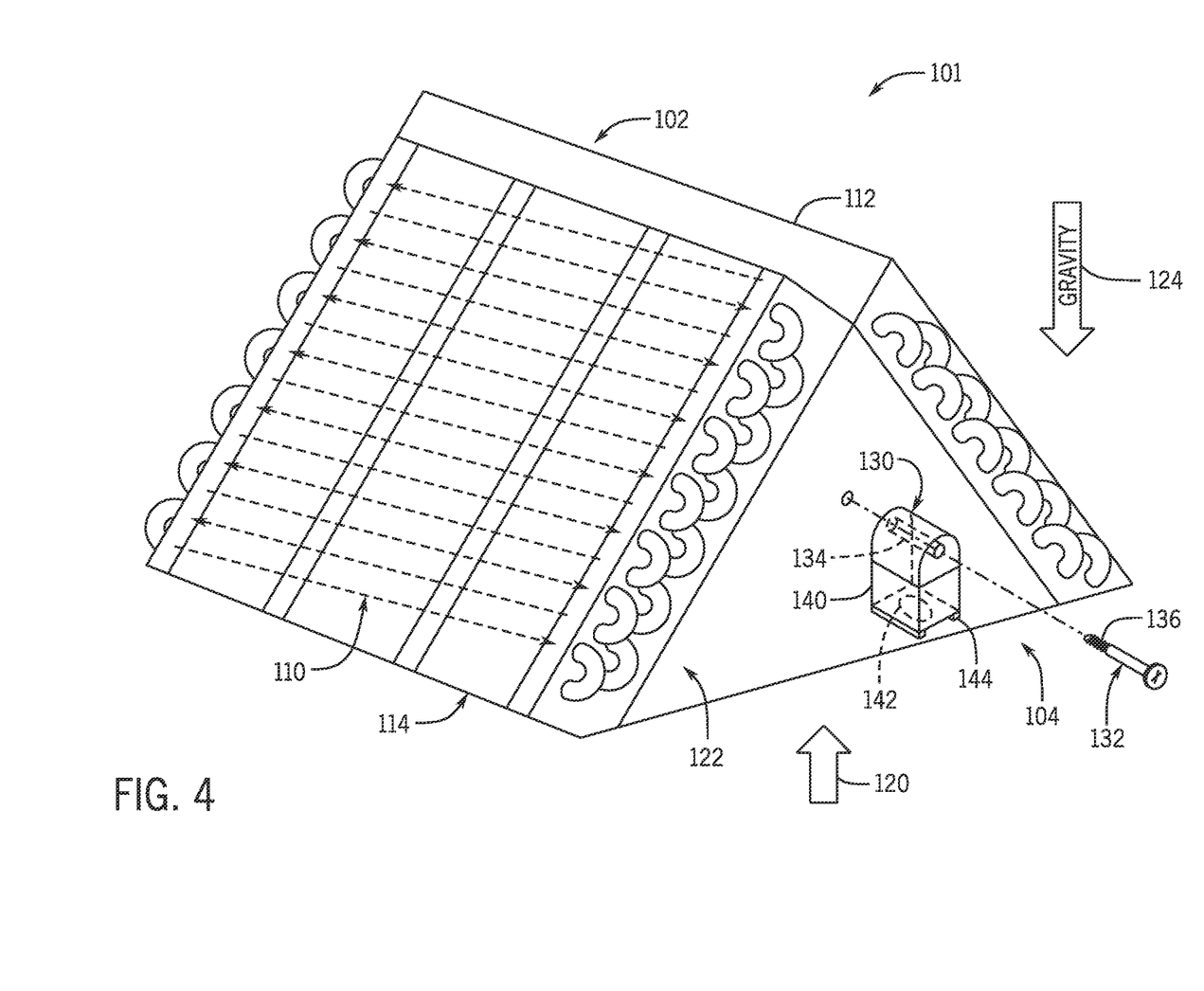
FIG. 4 is a partially exploded perspective view of an embodiment of a heat exchanger of the split system shown in FIG. 2 having an upflow configuration and a self-orienting sensing system, in accordance with present techniques.

With the above in mind, FIG. 4 is a perspective view of an embodiment of a HVAC system 101 having a heat exchanger 102 and a self-orienting sensing system 104 for reliably detecting refrigerant leaks from the heat exchanger 102. The heat exchanger 102 and the self-orienting sensing system 104 may be considered a heat exchanger assembly, in certain embodiments. The HVAC system 101 may be any suitable HVAC system discussed herein, including the HVAC unit 12, the residential heating and cooling system 50, the vapor compression system 72, or other HVAC systems. In some embodiments, the heat exchanger 102 corresponds to the heat exchanger 62 of FIG. 2. As shown, the heat exchanger 102 includes multiple coil passes 110 disposed within a frame 112. The frame 112 is illustrated as an A-shaped frame, but other suitably shaped frames, such as M-shaped frames, N-shaped frames, among others, may be employed by the techniques disclosed herein. The illustrated embodiment of the frame 112 includes a first frame portion 114 (e.g., first coil portion) coupled to a second frame portion 116 (e.g., second coil portion). The first and second frame portions 114, 116 may be angled relative to one another, such that an air flow 120 may be drawn or pushed through an open space within the first and second frame portions 114, 116 and across the multiple coil passes 110. Additionally, the illustrated heat exchanger 102 includes one or multiple delta plates 122 (e.g., air bypass sealing plates, support plates) coupled between the first and second frame portions 114, 116. In some embodiments, the delta plate 122 may restrict or direct the air flow 120 over the first and second frame portions 114, 116, while enabling U-bends, headers, and/or manifolds (e.g., coil portions, non-airflow coil portions) of the heat exchanger 102 to be generally fluidly separated from the air flow 120. In some embodiments, the delta plates 122 may also enhance the structural rigidity of the heat exchanger 102. Moreover, the delta plates 122 may be formed of any suitable material, such as sheet metal or plastic. In the illustrated embodiment, the heat exchanger 102 is in an upflow configuration, in which the air flow 120 is drawn or pushed across the heat exchanger 102 in a direction generally opposite to a gravitational force 124. As discussed below, a downflow configuration may be achieved by reversing a direction of the air flow 120.

Notably, the self-orienting sensing system 104 is coupled to the delta plate 122, which is relatively close to brazes or joints of the heat exchanger 102. As such, implementing this sensing position for the self-orienting sensing system 104 may enable rapid detection of any refrigerant that may be inadvertently leaking from the heat exchanger 102. Indeed, in embodiments in which the delta plate 122 generally separates the air flow 120 from the self-orienting sensing system 104, the illustrated sensing position may be in a relatively stagnant area that enables effective detection of leaked refrigerant. Moreover, as the U-bends, headers, and/or manifolds of the heat exchanger 102 may direct relatively cold refrigerant therein that causes water vapor to condense thereon, implementing the self-orienting sensing system 104 on the delta plate 122 may also enable a sensing element within the self-orienting sensing system 104 to operate with a longer useable life and/or with reduced moisture contamination, as discussed below. However, as discussed above, it should be understood that the self-orienting sensing system 104 may be positioned at another suitable location within the HVAC system 101.

In the present embodiment, the self-orienting sensing system 104 includes a housing 130 (e.g., sensor housing, housing assembly), the sensing element retained within the housing 130, and a mounting retainer 132 that extends through a mounting channel 134 of the housing 130. The mounting retainer 132 may be any suitable fastener with a generally cylindrical surface (e.g., smooth, threaded) around which the housing 130 may pivot under the passive influence of gravity. That is, although discussed herein as a shoulder screw, it should be understood that the mounting retainer 132 may alternatively be a long threaded screw, a bolt, and so forth. The mounting retainer 132 may include a fastening end 136 (e.g., self-tapping end, self-tapping screw) that pierces and protrudes through the delta plate 122 upon installation of the self-orienting sensing system 104. However, other embodiments may include a pre-drilled hole or a marker (e.g., a dimple) on the delta plate 122 to facilitate positioning of the self-orienting sensing system 104 thereon in a location that enables rotation of the housing 130, such as full rotation through 360 degrees.

The illustrated housing 130 includes a main body 140 that defines a sensing aperture 142 therethrough, such that refrigerant may traverse the sensing aperture 142, enter the housing 130, and be detected by the sensing element therein. As discussed in detail below, the self-orienting sensing system 104 enables the sensing element and the sensing aperture 142 to maintain a downward-facing orientation relative to the gravitational force 124 for effective leak detection (e.g., without impedance from moisture that may drip from the U-bends, headers, and/or manifolds), regardless of the configuration in which the heat exchanger 102 is installed. Indeed, the housing 130 and the components therein generally provide a center of mass that is between the mounting channel 134 and a lower edge 144 or bottom surface of the housing 130, such that the housing 130 may freely pivot relative to the mounting retainer 132 to reach a downward-facing, target sensing orientation.

Figure 5:
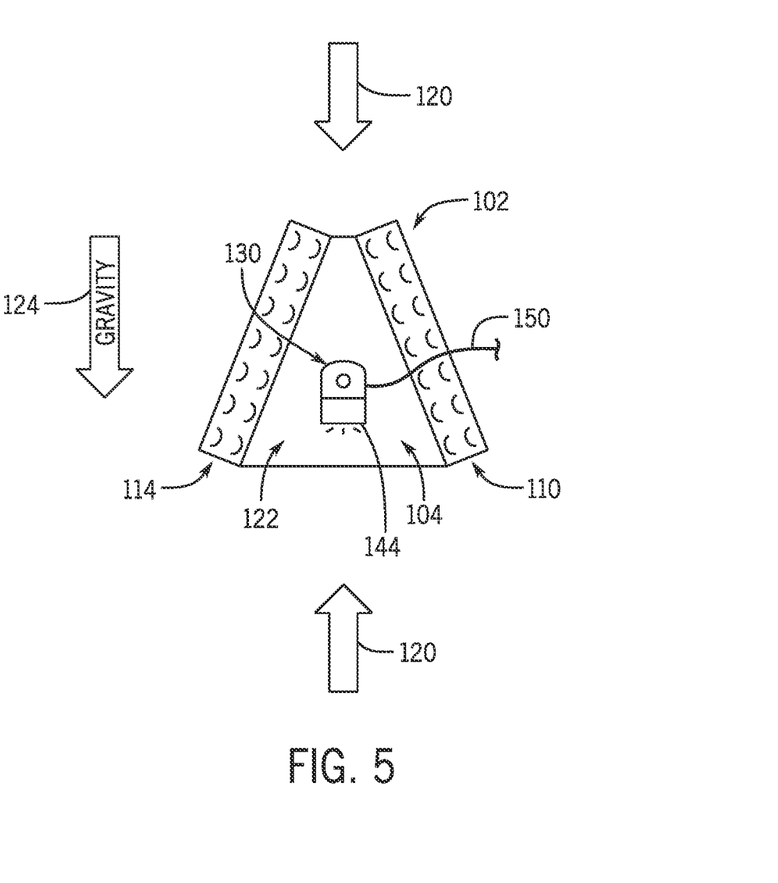
FIG. 5 is a side view of an embodiment of the heat exchanger of FIG. 4 having the upflow configuration or a downflow configuration, in accordance with present techniques.

In other embodiments, the heat exchanger 102 may be oriented in another direction relative to air flows and/or the gravitational force 124, and the self-orienting sensing system 104 will automatically pivot or adjust to reach the target sensing orientation. For example, FIG. 5 is a side view of an embodiment of the heat exchanger 102 of the HVAC system 101 having a downflow configuration or the upflow configuration (e.g., collectively, vertical configurations) discussed above. In the upflow configuration, the air flow 120 is directed upward toward the heat exchanger 102, in a direction against or opposite to the gravitational force 124. In the downflow configuration, the air flow 120 is directed downward toward the heat exchanger 102, in a direction parallel to the gravitational force 124. Without human intervention, the self-orienting sensing system 104 automatically pivots, relative to the delta plate 122 to which it is coupled, to reach the target sensing orientation, in which the lower edge 144 of the housing 130 may be closest to or directed toward a ground or base surface beneath the heat exchanger. The housing 130 may also receive a sensing wire 150 that facilitates communications between the sensing element therein and a controller, such as the control panel 82 discussed above. In response to receiving electrical signals from the sensing element, the controller may initiate or actuate any suitable control actions, such as activating a blower of the HVAC system 101, deactivating a compressor of the HVAC system 101, logging fault codes, and/or entering fault conditions or fault modes.

Figure 6:
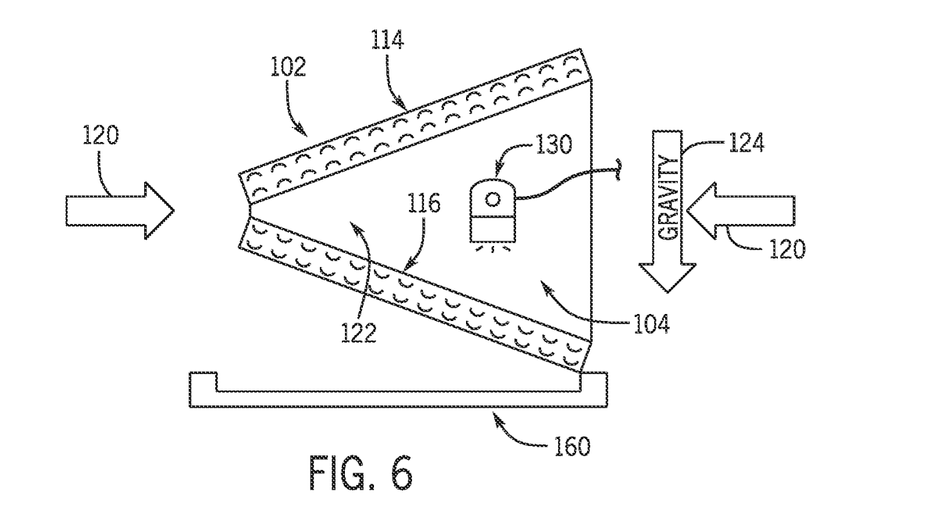
FIG. 6 is a side view of an embodiment of the heat exchanger of FIG. 4 having a horizontal right configuration or a horizontal left configuration, in accordance with present techniques.
Figure 7:
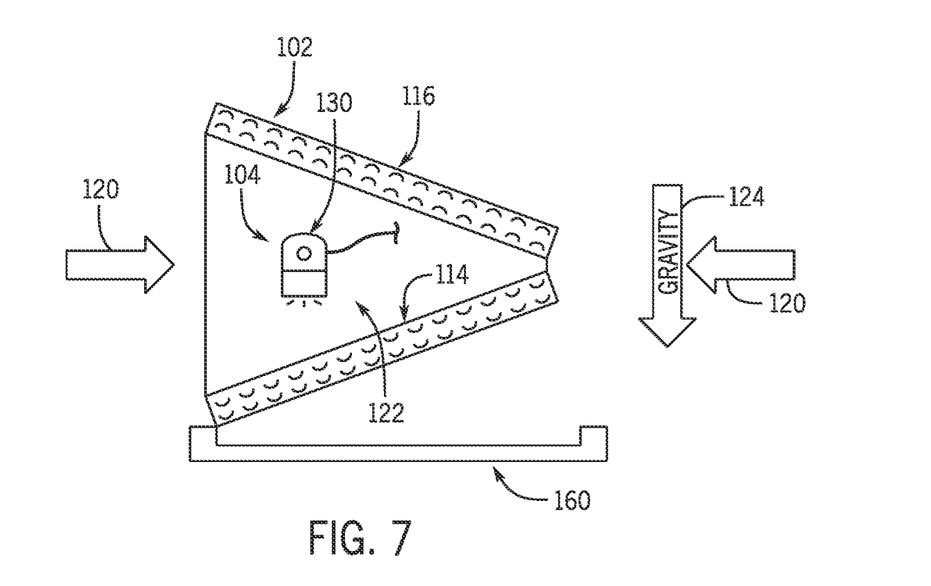
FIG. 7 is a side view of another embodiment of the heat exchanger of FIG. 4 having the horizontal right configuration or the horizontal left configuration, in accordance with present techniques.

As further examples, FIG. 6 is a side view of an embodiment of the heat exchanger 102 having a horizontal right configuration or a horizontal left configuration (e.g., collectively, horizontal configurations), depending on a direction in which the air flow 120 passes over the heat exchanger 102. Whether the air flow 120 passes from left to right in the horizontal right configuration or passes from right to left in the horizontal left position, the air flow 120 travels in a direction that is generally perpendicular to the gravitational force 124. Moreover, a drain pan 160 is positioned beneath the second frame portion 116 of the heat exchanger 102, in the present embodiment. Regardless of the changed configuration relative to FIGS. 4 and 5, the self-orienting sensing system 104 is again aligned in the target sensing orientation. Similarly, the embodiment of the heat exchanger 102 of FIG. 7 alternatively includes the drain pan 160 positioned beneath the first frame portion 114 of the heat exchanger 102. However, regardless of whether the heat exchanger 102 is positioned in the horizontal right configuration or the horizontal left configuration relative to the air flow 120, the self-orienting sensing system 104 is self-adjusted to the target sensing orientation. Indeed, due to the natural action of gravity, the self-orienting sensing system 104 may effectively operate in the downward-facing target sensing orientation, without being manually oriented by a service technician during installation.

Figure 8:
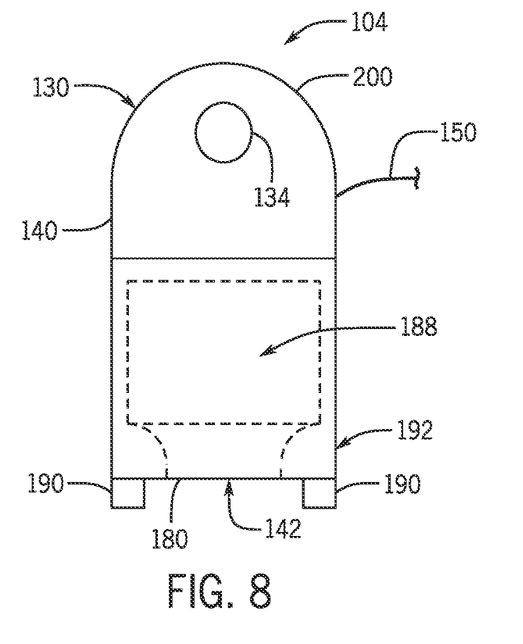
FIG. 8 is a front view of an embodiment of a sensor housing assembly of the self-orienting sensing system of FIG. 4, in accordance with present techniques.

With attention to the housing 130 in more detail, FIG. 8 is a front view of an embodiment of the housing 130 of the self-orienting sensing system 104. As illustrated, the sensing aperture 142 is defined through a lower surface 180 of the main body 140, thereby fluidly coupling an external environment to a sensing chamber 188 defined within the housing. It should be understood that the sensing aperture 142 and the housing 130 may take any other suitable shape that facilitates refrigerant detection, as the illustrated embodiment is merely one example of many possible physical configurations. Notably, one or more counterweights 190 may be added or integrally formed with the lower surface 180 of the housing 130, increasing the mass of the housing 130 that is defined beneath the mounting channel 134. In some embodiments, the counterweights 190 may be the same material as the housing 130, such as plastic or metal. However, in other embodiments, the counterweights 190 may be denser than a remaining portion of the main body 140, thereby increasing the ability of the housing 130 to self-orient relative to the mounting retainer 132 (e.g., which operates as a fulcrum) and the delta plate 122.

It should be understood that the counterweights 190 may extend around a full perimeter of the lower surface 180, in certain embodiments. Additionally, the counterweights or additional counterweights may be added to or integrally formed with a lower portion of side surfaces 192 of the housing 130. In any case, the counterweights 190 may beneficially operate as a water diverter, skirt, or scaffolding that blocks water or debris from entering the sensing aperture 142. Moreover, the housing 130 may include a rounded upper surface 200 (e.g., rounded upper edge) and/or any other suitable physical structures that block or prevent water or debris from collecting on the housing 130. For example, in other embodiments, an upper portion of the housing 130 may include a tapered body, such as one that resembles an angled roof.

Figure 9:
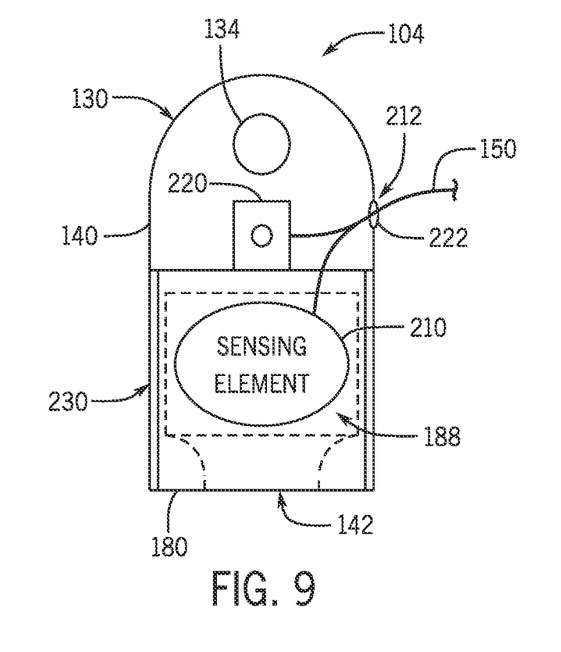
FIG. 9 is a front view of an embodiment of a sensor housing assembly of the self-orienting sensing system of FIG. 4, in accordance with present techniques.

As another example, FIG. 9 is a front view of an embodiment of the housing 130 illustrating a sensing element 210 (e.g., refrigerant sensing element) retained therein. The sensing element 210 may be any suitable refrigerant sensor or components thereof, such as one that may operate more effectively and with a longer service life when positioned in the illustrated target sensing orientation (e.g., downward facing and aligned with the sensing aperture 142). That is, the housing 130 may operate as a protective cover to restrict condensate and contaminants from contacting the sensing element 210 from above, thereby preserving or extending the service life of the sensing element 210 for leaked refrigerant detection. In some embodiments, the sensing element 210 includes sensing circuitry that provides an electrical signal indicative of leaked refrigerant, which may be in a gas or vapor phase. As non-limiting examples, the sensing element 210 and/or sensing circuitry thereof may be or include a Metal-Oxide Semiconductor (MOS) sensor or a Non-Dispersive InfraRed (NDIR) sensor. The sensing circuitry may be coupled to a printed circuit board, in some embodiments. The sensing element 210 may be retained within the sensing chamber 188 of the housing 130 by any suitable features, such as adhesive or fasteners. However, in other embodiments, the housing 130 may be a two piece assembly that snaps into place around the sensing element 210 for rapid and efficient construction. In such embodiments, the sensing element 210 may be efficiently replaced, while the remainder of the self-orienting sensing system 104 is suitable for reuse with a replacement sensing element.

Moreover, the sensing wire 150 may traverse a wire port 212 into the housing 130 to communicatively couple the sensing element 210 to the control panel 82 or another suitable control device. In some embodiments, an orientation sensor 220, such as an inclinometer, accelerometer, or gyroscope, may be retained within the housing 130 to facilitate verification of whether the self-orienting sensing system 104 is in the target sensing orientation. For example, the orientation sensor 220 may transmit sensor signals to the controller indicative of a current orientation of the housing 130. In such embodiments, the controller may efficiently monitor a current orientation of the self-orienting sensing system 104, and present fault codes corresponding to the current orientation being outside a threshold range (e.g., 5 degrees, 10 degrees) from the target sensing orientation. The wire port 212 may be equipped with a gasket 222, such as an O-ring, to reduce unintentional egress of water or debris into the sensing chamber 188. In other embodiments, a gutter or condensate collector may be formed on or added to the housing 130 to increase the sensing fidelity of the self-orienting sensing system 104

In alternative or addition to the counterweights 190 discussed above, the housing 130 may include walls 230 of greater thickness and/or density to contribute to establishing a center of mass between the mounting channel 134 and the lower surface 180 of the housing. Moreover, it is presently recognized that the weight of the sensing element 210 and the orientation sensor 220 may also be positioned to contribute to the center of mass to beneficially enable the self-alignment properties of the self-orienting sensing system 104.

Figure 10:
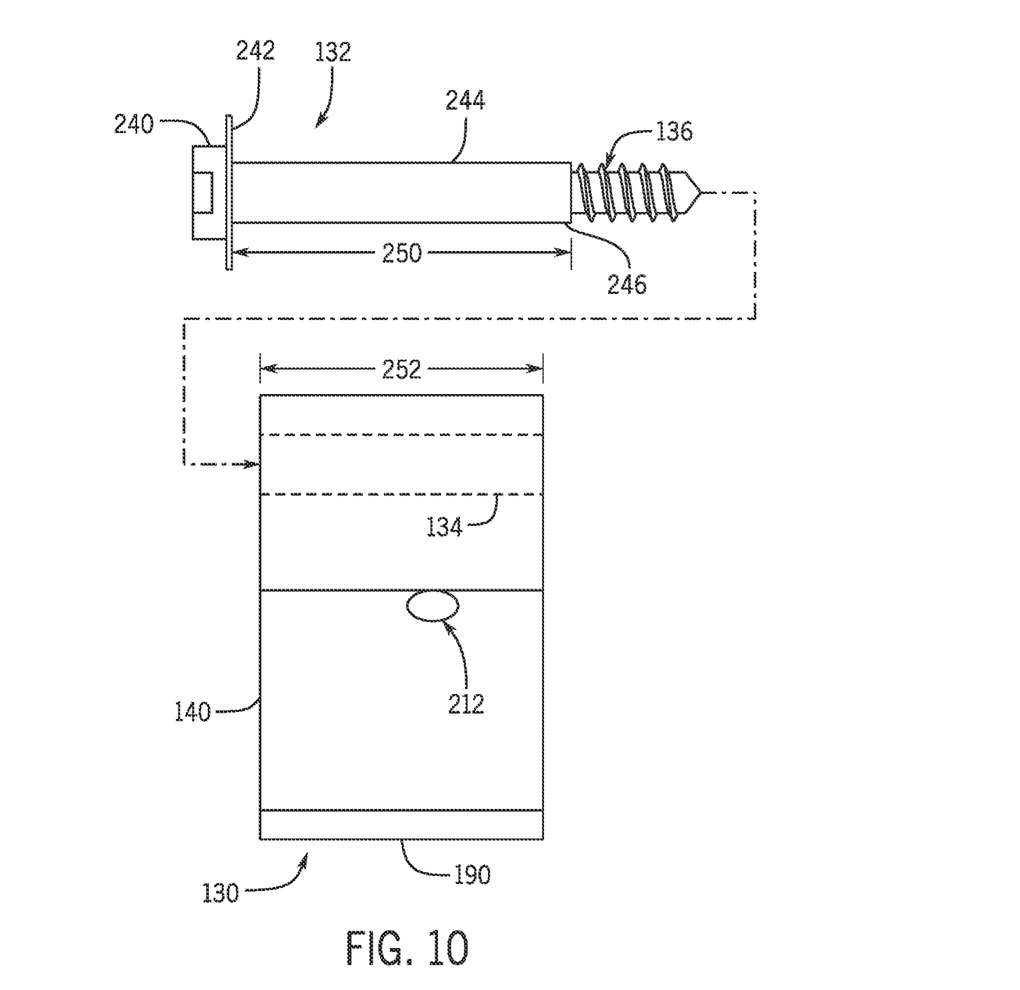
FIG. 10 is a partially exploded side view of an embodiment of the self-orienting sensing system of FIG. 4, in accordance with present techniques.

FIG. 10 is a partially exploded side view of an embodiment of the self-orienting sensing system 104, illustrating one possible embodiment of the mounting retainer 132 as a shoulder screw interacting with the housing 130 in more detail. As illustrated, the mounting channel 134 may be an enclosed tube that receives the mounting retainer 132 therein. In some embodiments, walls of the mounting channel 134 may be greased, lubricated, or otherwise smoothed to facilitate effortless pivoting of the housing 130 relative to the mounting retainer 132. Additionally, the mounting retainer 132 of the present embodiment includes a retainer main body having a tooled head 240 that defines a housing shoulder 242 (e.g., first shoulder), a rounded mounting barrel 244 that defines a delta plate shoulder 246 (e.g., second shoulder), and the fastening end 136. Notably, the mounting barrel 244 includes a barrel length 250 that is at least as long as a channel length 252 of the mounting channel 134. As such, upon assembly of the self-orienting sensing system 104, the mounting barrel 244 may extend through the mounting channel 134 and enable the housing 130 to rotate relative to the mounting retainer 132. Moreover, the delta plate shoulder 246 may enable the fastening end 136 to protrude a desired distance through the delta plate 122, while the housing shoulder 242 may enable the housing 130 to be efficiently retained between the tooled head 240 and the delta plate 122. In other embodiments, the fastening end 136 may correspond to a threaded bolt that is retained within a hole of the delta plate via a nut. Further, as mentioned above, the mounting retainer 132 may alternatively be a long threaded screw, bolt, or so forth that provides a suitable barrel length 250 about which the mounting channel 134 may pivot. In embodiments in which a threaded portion of the mounting retainer 132 is provided within the mounting channel 134, the mounting channel 134 may be suitably sized, lubricated, and/or threaded to facilitate the self-orientation discussed herein.

Figure 11:
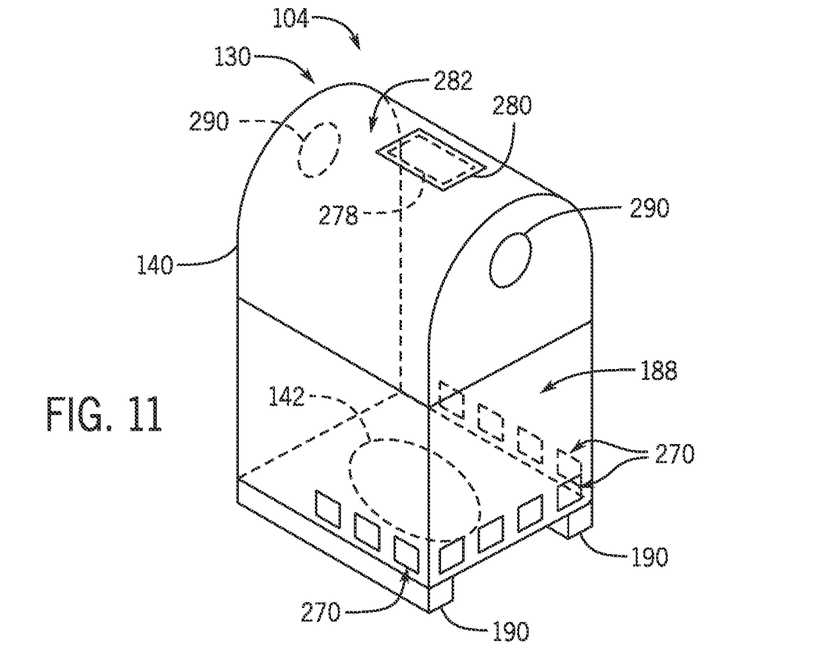
FIG. 11 is a perspective view of an embodiment of a sensor housing assembly of the self-orienting sensing system of FIG. 4, in accordance with present techniques.

Looking to further examples, FIG. 11 is a perspective view of an embodiment of the housing 130 of the self-orienting sensing system 104. In the illustrated embodiment, the housing 130 may include various lower openings 270 that enable a chimney effect to draw air samples through the housing 130 for enhancing refrigerant sensing. The lower openings 270 may have any suitable shape, number, and/or placement within the main body 140 of the housing 130. Although the lower openings 270 may reduce a weight of the lower portion of the housing 130, the counterweights 190 may be particularly selected and designed to ensure the housing 130 has the desired weight properties for gravity-assisted self-alignment. Moreover, an upper opening 278 may enable the air samples to travel out of an upper portion 282 of the housing 130, as the sensing element 210 discussed above may heat the air samples to facilitate the chimney affect. As illustrated, the upper opening 278 is protected by a cover 280 that blocks material or fluids from inadvertently entering the upper opening 278 from outside the housing 130. That is, the cover 280 enables vapor to flow up and out of the sensing chamber 188, while blocking entrance of moisture down into the sensing chamber 188. However, it should be understood that any suitable cover assembly, diverter, louver, chimney top, and so forth may be utilized as the cover 280, or, alternatively, that the chimney effect may be caused within the housing 130 by another suitable configuration of components (e.g., a chimney stack extending from the housing 130). Further, as illustrated, certain embodiments of the housing 130 may include two mounting openings 290 defined through the main body 140 of the housing 130, in place of the mounting channel 134, to simplify construction. In such embodiments, gaskets may be fitted within the mounting openings 290 to protect the integrity of the sensing chamber 188 and prolong the service life of the sensing element 210.

Figure 12:
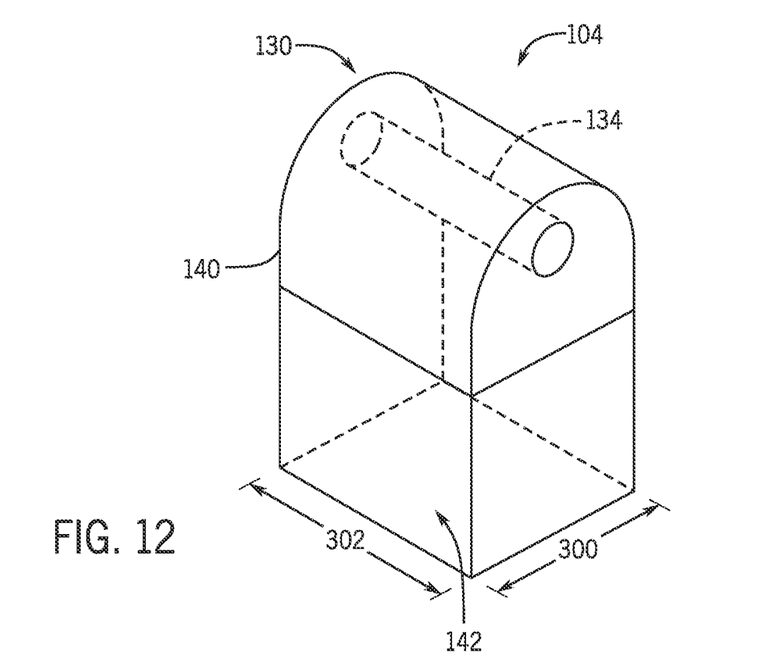
FIG. 12 is a perspective view of an embodiment of a sensor housing assembly of the self-orienting sensing system of FIG. 4, in accordance with present techniques.
Figure 13:
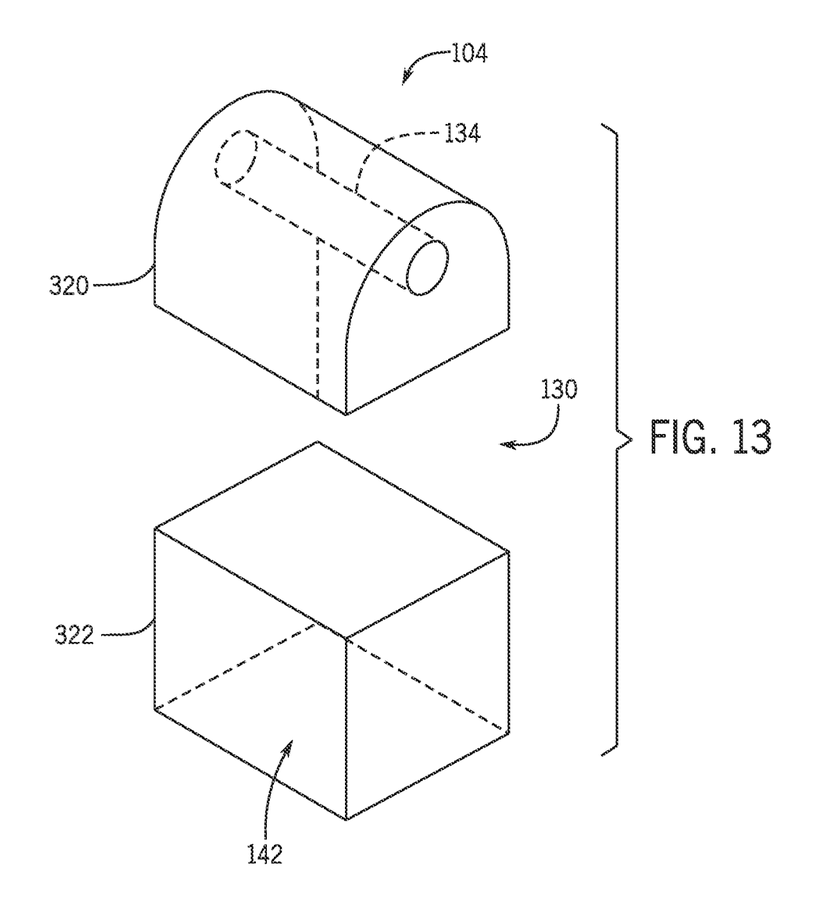
FIG. 13 is a partially exploded view of an embodiment of a sensor housing assembly of the self-orienting sensing system of FIG. 4, in accordance with present techniques.

As further examples, FIG. 12 is a perspective view of another embodiment of the housing 130, in which the sensing aperture 142 is defined to have a full width 300 and a full length 302 of the housing 130. Such embodiments may be constructed with walls of greater weight (e.g., greater density, greater thickness), may include the mounting channel 134 closer to the rounded upper surface 200, or any other suitable adjustments to establish the appropriate center of mass for the housing 130. Having the relatively larger sensing aperture 142 may improve operation of the sensing element 210 discussed above, such as by enabling a greater sample volume to travel upward and contact the sensing element 210, while condensate drops are diverted by remaining portions of the housing 130. Moreover, FIG. 13 is a partially exploded view of another example embodiment of the housing 130. As mentioned above, the housing 130 may be formed from multiple parts, such as a first housing part 320 and a second housing part 322, that snap or couple together in any suitable manner to facilitate access to, installation of, and/or replacement of the sensing element 210 therein. For example, in some embodiments, the housing parts 320, 322 may be coupled via corresponding snap-on extensions, an interference fit, replaceable adhesives, and so forth.

Accordingly, the present disclosure is directed to various embodiments of the self-orienting sensing system 104 that facilitate refrigerant detection near the heat exchanger 102. The self-orienting sensing system 104 includes the housing 130 that enables the sensing element 210 to be automatically adjusted to a target sensing orientation, via rotation of the mounting channel 134 of the housing 130 around the single mounting retainer 132. Indeed, certain sensing elements 210 may be orientation-specific and operate more effectively when aligned with a downward-facing sensing aperture 142 to correctly sense refrigerant from a moisture and/or debris-free environment. Moreover, because the heat exchanger 102 or air handler thereof may be installed of one multiple configurations (e.g., upflow, downflow, horizontal right, horizontal left), the orientation-specificity of the sensing element 210 may be alleviated by the presently disclosed self-orienting sensing system 104. Indeed, as discussed above, the self-orienting sensing system 104 defines a center of gravity that enables the housing 130 to passively or automatically self-orient to a downward-facing target sensing position, without manual intervention from a service technician.

While only certain features and embodiments of the present disclosure have been illustrated and described, many modifications and changes may occur to those skilled in the art, such as variations in sizes, dimensions, structures, shapes and proportions of the various elements, values of parameters including temperatures, pressures, and so forth, mounting arrangements, use of materials, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described, such as those unrelated to the presently contemplated best mode of carrying out the disclosure, or those unrelated to enabling the claimed features. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and air conditioning (HVAC) system, comprising:
   a sensor housing comprising a main body, a sensing chamber formed within the main body, and a sensing aperture extending through the main body to fluidly couple the sensing chamber with an environment external to the sensor housing;
   a sensor disposed within the sensing chamber, wherein the sensor is configured to detect a refrigerant within the sensing chamber; and
   a mounting retainer configured to couple the sensor housing to a surface of the HVAC system, wherein the sensor housing is configured to automatically rotate about the mounting retainer to orient the sensing aperture in a downward-facing direction in response to a force of gravity.

2. The HVAC system of claim 1, wherein the main body comprises a lower surface, and the sensing aperture is formed in the lower surface.

3. The HVAC system of claim 2, wherein the main body comprises a counterweight configured to orient the sensing aperture in the downward-facing direction in response to the force of gravity.

4. The HVAC system of claim 3, wherein the counterweight is coupled to the lower surface and is offset from the sensing aperture.

5. The HVAC system of claim 1, wherein the sensor housing comprises at least one counterweight integrally formed with a lower edge of the main body.

6. The HVAC system of claim 1, wherein the main body comprises a mounting channel extending therethrough, and the mounting retainer is configured to extend through the mounting channel to pivotably couple the sensor housing to the surface of the HVAC system.

7. The HVAC system of claim 6, wherein the sensor housing comprises a first housing part and a second housing part, the first housing part comprises the mounting channel, the second housing part comprises the sensing chamber and the sensing aperture, and the first housing part and the second housing part are removably coupled to one another.

8. The HVAC system of claim 1, comprising a heat exchanger, wherein the heat exchanger comprises a first coil portion, a second coil portion, and a plate coupled to the first coil portion and the second coil portion, the first coil portion and the second coil portion are disposed at an angle relative to one another, and the plate comprises the surface.

9. The HVAC system of claim 8, wherein the heat exchanger is configured to be positioned in a first orientation and in a second orientation, and the sensor housing is configured to automatically rotate about the mounting retainer to orient the sensing aperture in the downward-facing direction in response to the force of gravity upon transition of the heat exchanger from the first orientation to the second orientation.

10. The HVAC system of claim 9, wherein the first orientation is a horizontal right configuration, and the second orientation is a horizontal left configuration.

11. The HVAC system of claim 9, wherein the first orientation is an upflow configuration, and the second orientation is a downflow configuration.

12. A heating, ventilation, and air conditioning (HVAC) system, comprising:
    a heat exchanger; and
    a self-orienting sensing system configured to couple to the heat exchanger, wherein the self-orienting sensing system comprises:
        a sensor housing comprising a main body, a sensing chamber formed within the main body, and a sensing aperture extending through the main body to fluidly couple the sensing chamber with an environment external to the sensor housing;
        a sensor disposed within the sensing chamber, wherein the sensor is configured to detect a refrigerant; and
        a mounting retainer configured to extend through the sensor housing and couple to the heat exchanger to couple the self-orienting sensing system to the heat exchanger,
    wherein the self-orienting sensing system, in an installed configuration of the self-orienting sensing system with the heat exchanger, is configured to automatically adjust to a target sensing orientation in each configuration of a plurality of configurations of the heat exchanger, wherein the sensing aperture faces downward, relative to gravity, in the target sensing orientation.

13. The HVAC system of claim 12, wherein the sensor housing is configured to rotate about the mounting retainer to automatically adjust to the target sensing orientation.

14. The HVAC system of claim 12, wherein the heat exchanger comprises a first coil portion, a second coil portion, and a delta plate extending from the first coil portion to the second coil portion, and the mounting retainer is configured to couple to the delta plate.

15. The HVAC system of claim 14, wherein the plurality of configurations comprises a horizontal left configuration, a horizontal right configuration, an upflow configuration, a downflow configuration, or any combination thereof.

16. The HVAC system claim 12, wherein the sensor housing comprises a counterweight coupled to a surface of the main body, the sensing aperture is formed in the surface, and the counterweight is offset from the sensing aperture.

17. The HVAC system of claim 12, wherein the self-orienting sensing system is configured automatically adjust to the target sensing orientation in response to transition of the heat exchanger from a first configuration of the plurality of configurations to a second configuration of the plurality of configurations.

18. A self-orienting sensing system of a heating, ventilation, and air conditioning (HVAC) system, wherein the self-orienting sensing system comprises:
    a housing comprising a main body, a sensing chamber formed within the main body, a mounting channel extending through the main body, and a sensing aperture formed in a surface of the main body and fluidly coupling the sensing chamber with an environment surrounding the housing;
    a refrigerant sensor disposed within the sensing chamber; and
    a mounting retainer configured to extend through the mounting channel and couple to a component of the HVAC system to couple the self-orienting sensing system to the component,
    wherein the housing, in an installed configuration of the self-orienting sensing system with the HVAC system, is configured to automatically rotate about the mounting retainer to orient the sensing aperture in a downward-facing position, relative to gravity.

19. The self-orienting sensing system of claim 18, wherein the self-orienting sensing system comprises a center of mass between the mounting channel and the surface.

20. The self-orienting sensing system of claim 18, comprising an orientation sensor disposed within the housing and configured to detect an orientation of the housing.

* * * * *